3,684,674
PROCESS FOR PREPARING 18-CYANO-
PREGNANE COMPOUNDS
Georg Anner, Schaeublinstrasse 91, and Jaroslav Kalvoda,
Leimenstrasse 51, both of Basel, Switzerland
No Drawing. Filed Apr. 14, 1970, Ser. No. 28,531
Claims priority, application Switzerland, Apr. 18, 1969,
5,902/69
Int. Cl. B01j 1/10
U.S. Cl. 204—158 R
10 Claims

ABSTRACT OF THE DISCLOSURE

The subject of this application is a new process for the manufacture of 18-cyano-pregnane compounds, especially 11β-hydroxy-18-cyano-20-oxo-pregnane compounds. It is based on the finding that an 11-O nitrite of an 11β,20-dihydroxy-20-cyano-pregnane compound is converted into the corresponding 11β - hydroxy-18-cyano-20-oxo-pregnane compound when irradiated with ultraviolet light. The invention also includes new 18 - cyano-11β-hydroxy-20-oxo-pregnane compounds having pharmacological activities.

BACKGROUND OF THE INVENTION

The 18-cyano-steroids of the pregnane series are valuable intermediate products for the manufacture of pharmacologically active steroids, for example, 18-oxygenated steroids and 18-methylene steroids. Thus, for example, 18-cyano-pregnanes can be converted into 18-methylene-pregnanes by reduction with lithium-aluminium hydride, followed by N-methylation of the resulting primary amines and Cope degradation of the corresponding N-oxides. By oxidation of the double bond of the 18-methylene group, for example, by means of osmium tetroxide and subsequent splitting with lead tetraacetate the corresponding 18-oxo-pregnane compounds can be obtained. Pharmacologically active 18-methylene-pregnane compounds can be obtained in accordance with published German patent application 1,815,488.

The 18-cyano-steroids of the pregnane series can be obtained by the process described in U.S. Pat. No. 3,092,627 by reacting 20-hydroxy-20-cyano-steroids of the pregnane series with a compound containing monovalent positive iodine or a compound yielding it, according to the following scheme showing partial formulae

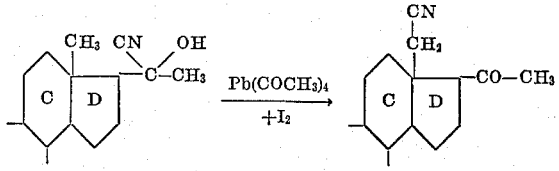

This general method presents difficulties in some cases, for example, in the case of compounds carrying an oxygen-function in the 17- and/or 21-position, because in the treatment with the aforesaid iodine-containing reagents splitting of the C(17)→(20) or of the C(20)→(21) bond takes place as a side reaction which predominates over the formation of 18-cyano-steroids, so that the yields of the said cyano-compounds are very unsatisfactory.

SUMMARY OF THE INVENTION

The present invention provides a new process for the manufacture of 11β - hydroxy-18-cyano-20-oxo-pregnane compounds in which the aforesaid difficulties do not arise and derivatives oxygenated in the 17- and/or 21-positions are obtained in a simple manner and with satisfactory yields. This new process is characterised in that an 11-O-nitrite of an 11β,20-dihydroxy-20-cyano-pregnane compound is irradiated with ultraviolet light, the 11β-hydroxy-18-cyano-20-oxo-pregnane compound formed is isolated from the reaction mixture, and, if desired, any protected hydroxyl or oxo groups are liberated or any free hydroxyl groups present are esterified or etherified and/or the 11β-hydroxy group is split off in compounds which are not substituted in 9-position, and, if desired, the obtained Δ⁹,¹¹-18-cyano-pregnene compounds are converted into the corresponding 9α - halogen - 11β-hydroxy-18-cyano-compounds in a manner known per se.

DESCRIPTION OF THE PREFERRED EMBODIMENTS

The pregnane compounds used as starting materials may contain, in addition to the aforesaid substituents in 11- and 20-position, in other positions one or more other substituents, for example, free, esterified or etherified hydroxyl groups, oxo groups, halogen atoms, hydrocarbon residues, for example, alkyl or alkenyl groups, especially methyl or methylene groups. They may also contain double bonds, for example, in one or more of the positions 1,2: 4,5:, 5,6 and 6,7. Among pregnanes there are therefore to be understood derivatives that are saturated or unsaturated in the nucleus, for example, those of the 5α- or 5β-pregnane series, or Δ⁴- or Δ⁵-pregnanes, or also the corresponding 19-nor-compounds.

Especially preferred are starting materials of the Formula I

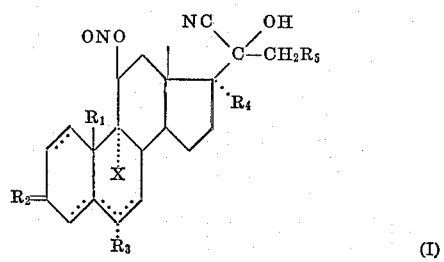

in which $R_1$ represents a methyl group or a hydrogen atom, $R_2$ represents two hydrogen atoms, an oxo group or a free, esterified or etherified hydroxyl group in α- or β-position together with a hydrogen atom, $R_3$ represents a hydrogen atom, a lower alkyl group or a halogen atom, $R_4$ represents, a free, esterified or etherified hydroxyl group, or together with $R_5$ represents an alkylidenedioxy or cycloalkylidenedioxy group, $R_5$ represents a hydrogen atom, a free, esterified or etherified hydroxyl group or a halogen atom, and X represents a hydrogen atom or halogen atom, and which compounds may contain a double bond in one or more of the positions 1,2: 4,5: 5,6 or 6,7. Specific starting materials are, for example the 11-O-nitrites of the 20-cyanhydrins of the following compounds: 11β - hydroxy-progesterone, corticosterone-21-esters, or cyclic 17,21-ketals of lower aliphatic and alicyclic ketones, such as acetone, methyl ethyl ketone, cyclohexanone and especially cyclopentanone, with hydrocortisone, prednisolone or 9α-fluoro-prednisolone.

In these starting materials the ester groups are preferably derived from saturated or unsaturated carboxylic acids of the aliphatic, aromatic or heterocyclic series, especially those containing 1 to 18 carbon atoms, for example, formic acid, acetic acid, propionic acid, butyric acids, valeric acids such as n-valeric acid, or trimethyl-acetic acid, trifluoracetic acid, caproic acids such as β-trimethyl-propionic acid or diethyl-acetic acid, or oenanthic, caprylic, pelargonic, capric and undecylic acids, for example, undecylenic acid, or lauric, myristic, palmitic or stearic acids, for example, oleic acid, or a cyclopropane, cyclobutane, cyclopentane or cyclohexane carboxylic acid, for example, cyclopropyl-methane carboxylic acid, cyclobutyl-methane carboxylic acid, cyclopentyl-ethane carboxylic acid, cyclohexyl-ethane carboxylic acid, or benzoic acid, or phenoxyalkane acids such as phenoxyacetic acid, or dicarboxylic acids such as succinic acid or phthalic acid, or quinolinic acid, or furan-2-carboxylic acid, 5-tert.-butyl furan - 2-carboxylic acid, 5-bromofuran-2-carboxylic acid, 5-bromofuran-carboxylic acid, or nicotinic acid or isonicotinic acid, or sulphonic acids such as benzene sulphonic acids, or inorganic acids such, for example, as phosphoric or sulphuric acids.

An etherified hydroxyl group is especially one derived from an alcohol containing 1 to 8 carbon atoms, for example, a lower aliphatic alkanol, such as ethyl alcohol, methyl alcohol, propyl alcohol, iso-propyl alcohol, or butyl or amyl alcohols, or araliphatic alcohols, especially monocyclic aryl-lower-aliphatic alcohols such as benzyl alcohol, or heterocyclic alcohols such as α-tetrahydropyranol or -furanol.

A lower alkyl group is especially a methyl group. The above mentioned alkylidenedioxy group is derived more especially from a lower aliphatic ketone, such as acetone or methyl ketone, and the cycloalkylidenedioxy group is preferably derived from a 5- or 6-membered cycloaliphatic ketone such as cyclopentanone or cyclohexanone.

The halogen atom in the above Formula I is preferably a fluorine or chlorine atom.

For the irradiation there are preferably used solutions of the said starting materials in a suitable organic or inorganic inert solvent, especially an unsubstituted or halogenated aliphatic or cycloaliphatic hydrocarbon, such as hexane, heptane, cyclohexane, methyl-cyclohexane, carbon tetrachloride, ethylene chloride or a straight-chain or cyclic ether, such as isopropyl ether, tetrahydrofuran or dioxan, but preferably an aromatic hydrocarbon such as benzene or toluene, if desired, in mixture with one or more of the above mentioned solvents.

For the irradiation there is used natural or artificial ultra-violet light such, for example, as is produced by low or high pressure mercury burners. The irradiation is preferably carried out at room temperature or optionally at a lower temperature; but a slightly raised temperature may be used.

The isolation of the products present in the irradiated solution may be carried out by a method in itself known, preferably by chromatography on silica gel or aluminium oxide, the desired compounds being present in the weakly polar fractions.

The optional conversion of protected oxo or hydroxyl groups into the corresponding free groups may be carried out by a method in itself known. Thus, for example, ketals are split up by treatment with acids, preferably dilute acids, for example, acetic acid or perchloric acid. Etherified hydroxyl groups, for example, the aforesaid 17,21-acetals, are liberated by acid hydrolysis. Esterified hydroxyl groups are preferably split up by alkaline treatment, for example, with aqueous or alcoholic or aqueous-alcoholic solutions of alkali metal hydroxides or alkali metal carbonates.

An 11β-hydroxyl group in the 18-cyano-pregnane compounds obtained according to the process is optionally split off in a manner known per se, e.g. by treatment with a dehydrating agent such as a sulfonyl halide e.g. methyl chloride, preferably in the presence of small quantities of sulfur dioxide, in a tertiary organic base, e.g. collidine or an N-halogenamide or N-halogenoimide, for example N-bromosuccinimide, and sulphur dioxide under anhydrous conditions, preferably in pyridine.

The optional conversion of the 9,11-dehydro-18-cyano compounds thus obtained into the 9α - halogen-11β-hydroxy-18-cyano compounds is also performed in conventional manner, for instance by treatment with a hypohalogenous acid derivative, such as bromosuccinimide or bromoacetamide, e.g. in the presence of perchloric acid, if desired, splitting off of hydrobromic acid from the 11β-hydroxy-9α-bromo compounds thus obtained, for instance with sodium hydroxide or sodium acetate, and splitting of the 9,11β-epoxide thus obtained with a hydrohalic acid, e.g. hydrofluoric or hydrochloric acid in aqueous or anhydrous mediums. An especially convenient method of preparing 9α-11β-fluorohydrins consists in splitting the 9,11β-epoxide with the addition product obtained by reacting anhydrous hydrofluoric acid on a carbamic acid, especially urea.

The invention also includes the new 11β-hydroxy-18-cyano-20-oxo-pregnane compounds obtainable by the new process, especially those of the formula

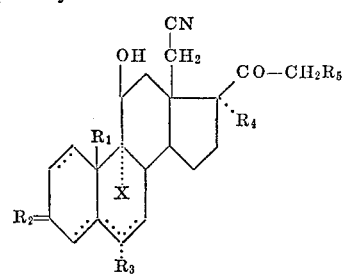

in which $R_1$ to $R_5$ and X have the meanings given above for Formula I, and which compounds may contain a double bond in one or more of the positions 1,2: 4,5: 5,6 or 6,7. Among these there are particularly to be pointed out those in which $R_2$ is an oxo group and $R_1$ a methyl group and in which there is a 4,5-double bond and their derivatives having a 1,2 and/or a 6,7 double bond.

In these compounds the esterified or etherified hydroxyl groups and the ketal groups are derived more especially from the acids or alcohols mentioned above in connection with the starting materials, and X is especially chlorine or fluorine when it represents a halogen atom.

Especially preferred are the compounds obtained by irradiation of the specific starting materials mentioned above and the optional liberation of esterified or etherified hydroxyl groups, for example, 18-cyano-11β-hydroxyprogesterone, 18-cyano-corticosterone, 18-cyano-hydrocortisone, 18-cyano-prednisolone, 18-cyano-9α-fluoro-prednisolone, and their functional derivatives, especially their 21-esters and -ethers, preferably those derived from the above mentioned acids or alcohols and particularly from lower aliphatic carboxylic acids, such as acetic acid, propionic acid, trimethylacetic acid, or caproic acids or oenanthic acids, or from lower aliphatic alcohols such as ethanol, propanol, butanols, and also tetrahydropyranyl ethers and tetrahydrofuranyl ethers.

The new compounds of the above Formula I possess valuable pharmacological properties. Thus, they exhibit, in addition to a mineral-corticoidal activity, more especially a gluco-corticoidal activity, as shown in tests on animals, for example, rats. They possess more especially anti-inflammatory and thymolytic properties. In addition, however, they also have anti-bacterial and diuretic activities.

The new compounds are also valuable intermediate products for the manufacture of other useful substances, especially pharmacologically active compounds. They can also be used as additives to foodstuffs.

The invention also includes any modification of the process in which there is used as starting material an intermediate product obtainable at any stage and the remaining steps are carried out, or in which a starting material is formed under the conditions of the reaction.

The following examples illustrate the invention:

Example 1

550 mg. of 3-oxo-11β-nitrosyloxy-20-hydroxy-20-cyano-Δ⁴-pregnene are dissolved in 250 ml. of absolute toluene, and irradiated in an apparatus provided with a centrally arranged Pyrex cooling finger with a 75-watt mercury high pressure burner while introducing nitrogen until the positive reaction with diphenylamine-sulphuric acid disappears (about 25 minutes). The slightly turbid reaction solution is then washed with water, then a mixture of a 1 N-solution of caustic soda and ice, and again with water. The washing water is then extracted with a mixture of ether and methylene chloride (4:1), the combined organic solutions are dried and evaporated under reduced pressure produced by a water-jet vacuum. There is obtained a light coloured crude product, which is dissolved in methylene chloride and filtered through ten times its weight of neutral aluminium oxide (Activity II). By evaporating the filtrate and recrystallising the residue from a mixture of methylene chloride and ether there is obtained pure 11β-hydroxy-18-cyano-3,20-dioxo-Δ⁴-pregnene melting at 258°–260°.

The nitrite-cyanhydrin used as starting material can be prepared as follows: A solution of 1.50 grams of 11β-hydroxy-progesterone in 15 ml. of pyridine, cooled to −10° C., is cautiously mixed with 0.5 ml. of nitrosyl chloride, and the whole is allowed to stand for 16 hours at 4° C. The reaction mixture is poured into about 1 litre of ice-water, the precipitate is filtered off, the filter residue is washed with water, then dissolved in chloroform, the solution is washed with ice-cold 1 N-caustic soda solution and with water, dried and evaporated under reduced pressure produced by a water-jet vacuum. The crude product so obtained is dissolved without purification in 45 ml. of absolute ethanol and, after the addition of 8.6 grams of potassium cyanide, 9 ml. of acetic acid are added in the course of 20 minutes, while stirring, at about 10° C. The reaction mixture, that slowly becomes solid, is stirred for a further 4 hours at room temperature, then diluted with about 20 ml. of water, then poured into about 500 ml. of ice-water, and the precipitated amorphous substance is separated off, dissolved in chloroform, dried and evaporated under reduced pressure produced by a water-jet vacuum at a bath temperature of about 35° C. The amorphous 3-oxo-11β-nitrosyloxy-20-hydroxy-20-cyano-Δ⁴-pregnene so obtained still contains about 20% of the corresponding free 20-oxo-compound, but it may be subjected without purification to the irradiation.

Example 2

A solution of 200 mg. of 3-oxo-11β-nitrosyloxy-17α,21-cyclopentylidenedioxy-20-hydroxy-20-cyano - Δ⁴ - pregene in 200 ml. of absolute benzene are irradiated with a 75-watt mercury high pressure burner under the conditions given in Example 1. Ten equal batches are combined, then washed in succession with water, a sodium thiosulphate solution of 15% strength, ice-cold 1 N-hydrochloric acid, water, ice-cold 1 N-caustic soda solution and again with water, the washing water is extracted with a mixture of ether and methylene chloride (4:1), the organic solutions are dried and evaporated under reduced pressure produced by a water-jet vacuum. The amorphous crude product so obtained is chromatographed on 30 times its weight of silica gel. In this manner 11β-hydroxy-18-cyano-3,20-dioxo-17α,21-cyclopentylidenedioxy - Δ⁴ - pregnene is obtained with a mixture of toluene and ethyl acetate (9:1). The compound melts at 228–229° C., after recrystallisation twice from a mixture of methylene chloride and ether.

The starting material used can be prepared as follows: From a suspension of 10 grams of hydrocortisone and 20 mg. of para-toluene sulphonic acid in 1800 ml. of benzene 100 ml. of the solvent are distilled off. 20 ml. of freshly distilled 1,1-diethoxy-cyclopentane are then added, and a further 1000 ml. of benzene are distilled off in the course of 45 minutes. The clear solution is then cooled to room temperature, 1.5 ml. of pyridine are added, and the mixture is worked up. The crude product so obtained is purified by crystallisation from a mixture of methylene chloride and methanol, and the 17,21-ketal melting at 212–215° C. is used for the further treatment. 4.0 grams of the compound are dissolved in 15 ml. of pyridine and reacted with 1.0 ml. of nitrosyl chloride as described in Example 1. The working up yields the pure 11-O-nitrite of the 17,21-ketal of hydrocortisone, which melts at 182° C. with decomposition. A suspension of 3.0 grams of the above compound in 100 ml. of absolute ethanol is reacted with 18.0 grams of potassium cyanide and 19.2 ml. of ethyl acetate as described in Example 1. By working up there is obtained the 20-cyanhydrin of the nitrite of the 17,21-ketal of hydrocortisone, which melts at 206° C. with decomposition and can be irradiated without further purification.

Example 3

500 mg. of 3-oxo-11β-nitrosyloxy-17α,21-cyclopentylidenedioxy-20-hydroxy-20-cyano-Δ¹,⁴-pregnadiene are dissolved in 250° ml. of absolute toluene, and irradiated in an apparatus provided with a centrally arranged Pyrex cooling finger at room temperature with a 75-watt mercury high pressure burner, while introducing nitrogen, until the positive reaction with diphenylamine-sulphuric acid disappears (about 30 minutes). Working in the manner described in Example 1 yields a yellowish amorphous crude product, from which 11β-hydroxy-17α,21-cyclopentylidenedioxy-18-cyano-3,20-dioxo - Δ¹,⁴ - pregnadiene is obtained by chromatography on silica gel [elution agent: a mixture of toluene and ethyl acetate (9:1)], and which compound melts at 213–214° C. after recrystallisation from a mixture of methylene chloride and ether.

The starting material used is obtained from the known 17,21-ketal (melting at 222–223° C.) of cyclopentanone with prednisolone as follows: 4.73 grams of the compound are dissolved in 37 ml. of pyridine and reacted with nitrosyl chloride under the conditions given in Example 1. The working up yields the crystalline 11-O-nitrite of the 17,21-cyclopentanone ketal of prednisolone, which melts at 202–204° C. with decomposition, after recrystallisation from a mixture of methylene chloride and ether. 4.45 grams of this compound are suspended in 150 ml. of absolute alcohol, and reaction with 27 grams of potassium cyanide and 28.5 ml. of glacial acetic acid under the conditions given in Example 1. By working up there is obtained a yellowish crude product that crystallises when sprayed with ether, and from which there is obtained by recrystallisation from a mixture of methylene chloride and ether the pure 20-cyanhydrin-11-O-nitrite melting at 166° C. with decomposition.

Example 4

A solution of 700 mg. of 11β-hydroxy-17α,21-cyclopentylidenedioxy-18-cyano-3,20-dioxo-Δ¹,⁴-pregnadiene in 5.6 ml. of methylene chloride and 28 ml. of acetone is mixed with 56.0 mg. of para-toluene sulphonic acid, and the whole is allowed to stand for 17 hours at room temperature. The reaction mixture is then poured into ice-water, extracted three times with methylene chloride, and the organic layer is washed with water, a saturated solution of sodium bicarbonate, and again with water, and then dried and evaporated under the reduced pressure of of a water-jet vacuum. The resulting crude 18-cyano-prednisolone is then purified by recrystallisation from a mixture of methylene chloride and methanol. It melts at 260° C.

Example 5

150 mg. of 11β-hydroxy-17α,21-cyclopentylidenedioxy-18-cyano-3,20-dioxo-Δ⁴-pregnene are reacted in a mixture of acetone and methylene chloride with para-toluene sulphonic acid in the manner described in Example 4. The working up followed by crystallisation of the crude product from a mixture of methylene chloride and ether yield the pure 18-cyano-hydrocortisone melting at 258–260° C.

Example 6

200 mg. of 18-cyano-prednisolone are dissolved in 1 ml. of pyridine and after the addition of 0.5 ml. of acetic anhydride, the whole is allowed to stand at room temperature for 3 hours. The usual working up yields crude 11β,17α-dihydroxy-18-cyano-3,20-dioxo-21-acetoxy - Δ¹,⁴-pregnadiene, which is purified by recrystallisation from a mixture of methylene chloride and ether. The purified product melts at 153–156° first and a second time at 228–229° C.

Example 7

Under the conditions described in Examples 1–3, a solution of 450 mg. of 3-oxo-9α-fluoro-11-nitrosyloxy-17α,21-cyclopentylidenedioxy-20-hydroxy-20-cyano - Δ$^{1,4}$-pregnadiene in a mixture of 200 ml. of toluene and 50 ml. of dioxan is irradiated with a high pressure mercury burner. Working up followed by chromatography on silica gel yields crude 3,20-dioxo-9α-fluoro-11β-hydroxy-17α,21-cyclopentylidenedioxy-18-cyano-Δ$^{1,4}$-pregnadiene, which is converted into the free 9α-fluoro-18-cyano-prednisolone by treatment with acetone and para-toluenesulfonic acid under the conditions stated in Example 4. The 3,20-dioxo-9α-fluoro-11β,17α-dihydroxy-18-cyano-21-acetoxy-Δ$^{1,4}$ - pregnadiene (9α-fluoro-18-cyanoprednisolone acetate) obtained by subsequent acetylation with pyridine-acetic anhydride is purified by recrystallization from methylene chloride/methanol/ether. Double melting point at 168–170 and 254–256° C.

Example 8

A solution of 2.85 g. of 18-cyano-prednisolone acetate in 18.5 ml. of dimethylformamide and 5.7 ml. of collidine is treated at 10° C. with 2.65 g. of a solution consisting of 3.18 g. of sulfur dioxide in 93.8 g. of methanesulfonic acid chloride. The mixture is stirred while being heated to 35° C. (internal temperature). After a reaction period of 20 minutes (maximum temperature: 41° C.), 18.5 ml. of water are added at 10° C., and after extensive dilution with water, the batch is extracted with chloroform. The organic extracts are washed successively with ice-cold N-hydrochloric acid, water, ice-cold N-sodium hydroxide solution, and again with water, then dried and evaporated under a water-jet vacuum. By chromatography on silica gel (eluant: 70:30 mixture of toluene/ethyl acetate), 9,11-dehydro-18-cyano-prednisolone acetate is obtained which when recrystallized from methylene chloride/ether, melts at 152–153° C.

Example 9

A solution of 1.7 g. of 9,11-dehydro-18-cyanoprednisolone acetate in 34 ml. of absolute dioxan and 2.9 ml. of perchloric acid solution (consisting of 0.4 ml. of 70% perchloric acid in 5.5 ml. of water) is stirred at room temperature while being treated, in the course of 10 minutes, with a solution of 885 mg. of N-bromacetamide in 30 ml. of absolute dioxan. Stirring is then continued at room temperature for 4 hours. The yellow reaction solution is poured into an ice-cold 15% potassium iodide solution and extracted twice with chloroform, after which the organic phases are washed successively with 15% sodium thiosulfate solution, water, ice-cold N-hydrochloric acid, water, ice-cold N-sodium hydroxide solution, and again with water, dried over sodium sulfate, and evaporated at about 45° C. in a water-jet vacuum. The crude bromohydrin is dissolved in 85 ml. of acetone and, after the addition of 3.05 g. of anhydrous potassium acetate, refluxed for 14 hours. The reaction mixture is cooled, diluted with water, and extracted twice with chloroform. The extracts are washed successively with water, ice-cold N-hydrochloric acid, water, ice-cold N-sodium hydroxide solution, and water, then dried and evaporated in a water-jet vacuum. The slightly-colored crude product is separated on silica plates. The main zone, which is visible under UV light at 254 mμ, is eluted with a 1:1 mixture of chloroform and methanol. On recrystallization from methylene chloride/ether pure 9β,11β-oxido-18-cyano-prednisolone acetate is obtained which melts at (211) 221–222° C.

Example 10

700 mg. of 9β,11β-oxido-18-cyano-prednisolone acetate are introduced into 17.5 ml. of hydrogen fluoride-urea adduct (cf. for example U.S. Pat. No. 3.211,758), and the mixture is stirred for 5 hours while cooling with ice. While stirring vigorously, the reaction solution is poured into a mixture of 70 ml. of concentrated ammonia and 300 g. of ice, then extracted twice with chloroform. The organic phases are washed with water, dried and evaporated under a water-jet vacuum. The resulting 9α-fluoro-18-cyano-prednisolone acetate is purified by crystallization from methylene chloride/methanol/ether. The compound is identical with the preparation described in Example 7.

We claim:
1. Process for the manufacture of 11β-hydroxy-18-cyano-20-oxo-pregnane compounds wherein an 11β-O-nitrite of an 11β,20-dihydroxy-20-cyano-pregnane compound is irradiated with ultraviolet light.
2. Process as claimed in claim 1, wherein any protected hydroxy or oxo groups present in the 11β-hydroxy-18-cyano-20-oxo-pregnane compound obtained is liberated.
3. Process as claimed in claim 1, wherein any free hydroxyl group present in the 11β-hydroxy-18-cyano-20-oxo-pregnane compound is esterified or etherified.
4. Process as claimed in claim 1, wherein the irradiation is performed with ultra-violet light emitted from a high-pressure or low-pressure mercury burner.
5. Process as claimed in claim 4, wherein the irradiation is performed at room temperature or at a lower temperature.
6. Process as claimed in claim 5, wherein the irradiation is carried out in a solvent selected from the group consisting of an aliphatic, a cycloaliphatic or an aromatic hydrocarbon.
7. Process as claimed in claim 6, wherein the solvent used is benzene or toluene.
8. Process as claimed in claim 5, wherein the solvent used is an open-chain or cyclic ether.
9. Process as claimed in claim 8, wherein there is used isopropyl ether, tetrahydrofuran or dioxan.
10. Process as claimed in claim 1, wherein the 11β-hydroxy-18-cyano-20-oxo-pregnane compound is isolated from the reaction mixture by chromatography.

References Cited
UNITED STATES PATENTS

| | | | |
|---|---|---|---|
| 3,154,569 | 10/1964 | Ercoli et al. | 204—158 R |
| 3,215,713 | 11/1965 | Barton | 204—158 R |

HOWARD S. WILLIAMS, Primary Examiner